United States Patent [19]
Ashley

[11] Patent Number: 4,693,561
[45] Date of Patent: Sep. 15, 1987

[54] AMORPHOUS SILICON SPATIAL LIGHT MODULATOR

[75] Inventor: Paul R. Ashley, Toney, Ala.

[73] Assignee: The United States of America as represented by the Secretary of the Army, Washington, D.C.

[21] Appl. No.: 812,603

[22] Filed: Dec. 23, 1985

[51] Int. Cl.$^4$ .................. G02F 1/135; G02B 5/18
[52] U.S. Cl. .................. 350/336; 350/162.12; 350/342
[58] Field of Search .......... 350/336, 347 R, 348, 350/342, 162.12, 356

[56] References Cited

U.S. PATENT DOCUMENTS

| | | | |
|---|---|---|---|
| 3,744,874 | 7/1973 | Beard et al. | 350/162.12 |
| 3,834,794 | 9/1974 | Soref | 350/336 |
| 3,843,231 | 10/1974 | Borel et al. | 350/348 |
| 4,074,302 | 2/1978 | Brewer | 350/342 X |
| 4,277,145 | 7/1981 | Hareng et al. | 350/342 |
| 4,389,096 | 6/1983 | Hori | 350/348 X |
| 4,432,611 | 2/1984 | Wei | 350/336 |
| 4,639,091 | 1/1987 | Huignard et al. | 350/348 |

FOREIGN PATENT DOCUMENTS

| | | | |
|---|---|---|---|
| 0062825 | 4/1984 | Japan | 350/356 |
| 0081627 | 5/1984 | Japan | 350/342 |
| 0001025 | 11/1979 | PCT Int'l. Appl. | 350/336 |

OTHER PUBLICATIONS

Itakura et al, "Amplitude Modulated Reticle Constructed by a Liquid Crystal Cell Array", Applied Optics, vol. 20, No. 16, Aug. 15, 1981, pp. 2819–2826.

Fraser, "Sputtered Films for Display Devices", Proc. of IEEE, vol. 61, No. 7, Jul. 73, pp. 1013–1018.

Mtskeradze et al, "Individually Addressable Liquid Crystal Controlled Transparency", Sou. J. Quant. Elec. 8(1), Jan. 1978, pp. 128–130.

Pollack et al, "A Low Noise Image Amplifier", SID 76, Digest, pp. 142 & 143.

*Primary Examiner*—John K. Corbin
*Assistant Examiner*—David Lewis
*Attorney, Agent, or Firm*—James T. Deaton; Freddie M. Bush

[57] ABSTRACT

An amorphous silicon spatial light modulator that includes a unique three electrode structure that is used to create a two-dimensional electric field distribution in liquid crystal material. This modulator allows for the use of very thin photoconductor layers and a middle electrode in the form of a grating structure to provide control of the field shape while also providing for high spatial resolution.

4 Claims, 2 Drawing Figures

AMORPHOUS SILICON SPATIAL LIGHT MODULATOR

DEDICATORY CLAUSE

The invention described herein may be manufactured, used, and licensed by or for the Government for governmental purposes without the payment to me of any royalties thereon.

BACKGROUND OF THE INVENTION

Current spatial light modulators used in the art have relatively thick photoconductors and utilize a two electrode structure. Because of the thickness of the photoconductor, the spatial resolution is in many cases very limited with this prior art structure. These prior art devices include devices made with CdS or crystalline silicon. In devices of this type, in order to improve resolution, the speed or contrast is usually affected. In the case of crystalline silicon, a rather complicated integrated circuit is required in the surface of the photoconductor. Other photoconductor materials such as bismuth silicate (BSO) get around the problem of thickness limited resolution due to the very high resistivity of the material. However, in this case, the photoconductor material is a carefully grown single crystal and is therefore difficult to fabricate and produce in large sizes as well as being expensive to produce. Therefore, it can be seen that a more easily reproducable and compact modulator is needed.

Accordingly, it is an object of this invention to provide an amorphous silicon spatial light modulator that utilizes a three electrode structure to provide a more efficient device.

Another object of this invention is to provide a modulator that has three electrodes to add additional dimension to the control of the electric field.

Still another object of this invention is to provide a modulator in which very thin types of photoconductors can be used and yet provide large modulation effects.

A still further object of this invention is to provide a device in which a very thin amorphous silicon layer can be used with nematic types of liquid crystals.

Other objects and and advantages of this invention will be obvious to those skilled in this art.

SUMMARY OF THE INVENTION

In accordance with this invention, an amorphous silicon spatial light modulator is provided that includes a sandwich type structure with a multiplicity of layers and including a transparent substrate material with a layer of tin oxide on one surface of the substrate material with the tin oxide layer forming an electrode, a layer of amorphous silicon photoconductor mounted to a surface of the tin oxide layer, a grating layer made up of spaced apart strips of a metal such as aluminum, a layer of supported liquid crystal, and a final electrode layer of Indium Tin Oxide with one surface in contact with the liquid crystal layer and the Indium Tin Oxide layer being supported upon a transparent substrate material. These stacked and sandwiched layers of the various elements provide a thin and compact overall structure that provides for good light modulation of a linearly polarized source when an incoherent writing source is also applied to the modulator.

DESCRIPTION OF THE PREFERRED EMBODIMENT

Figure 1:
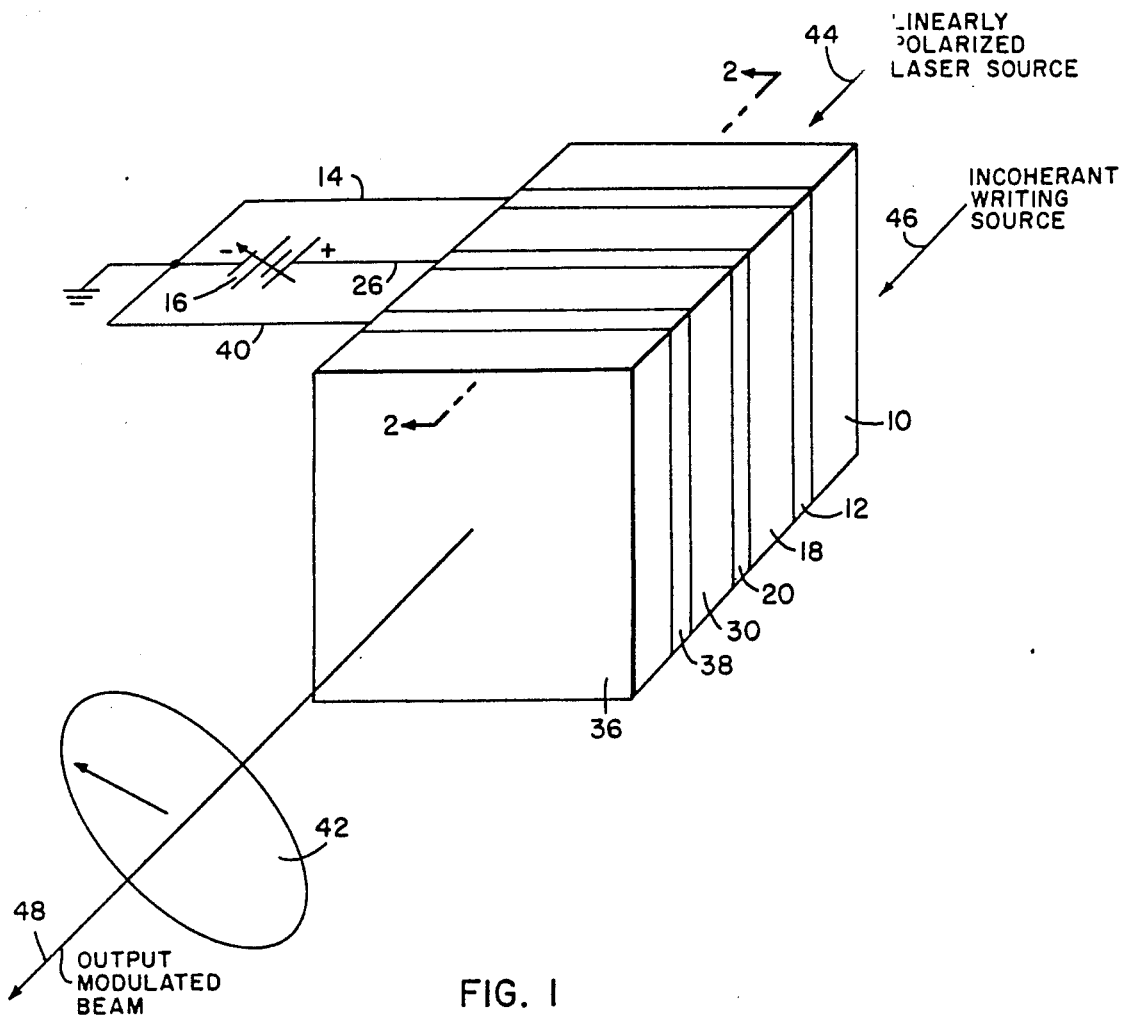
FIG. 1 is a schematic and enlarged illustration of the spatial light modulator in accordance with this invention.
Figure 2:
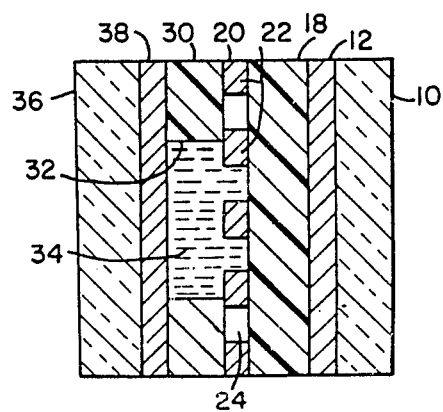
FIG. 2 is a sectional view taken along line 2—2 of FIG. 1.

Referring now to the drawing, the light modulator in accordance with this invention includes a sandwich structure made up of a multiplicity of layers with each layer having opposite faces. A first layer 10 of a transparent material to light such as glass is used and has a tin oxide layer 12 provided on one face of substrate 10 to provide a continuous conductive electrode layer of about 1,000 angstroms. This tin oxide layer as used in this invention is approximately 80 ohm cm, and electrode 12 is connected by lead 14 to ground and the negative side of variable voltage source 16. A layer 18 of amorphous silicon is applied over the face of electrode 12 that is opposite substrate 10. This amorphous silicon layer 18 forms a photoconductor. The thickness of layer 18 and its electro-optical properties can be varied. The layer used here is about 1 micron thick PIN diode structure with a dark resistivity of $5 \times 10^9$ ohm cm. On the exposed surface of silicon layer 18 is applied an aluminum coating 20 of approximately 1500 angstroms in the form of a linear grating. Coating 20 in the form of a linear grating has strips 22 with spaces 24 therebetween (see FIG. 2). Aluminum strips 22 and spaces 24 can be varied in width and the width used either of the strips or spaces can vary from about 12 to 50 microns. Contact and spatial resolution depends upon the width of the strips and the spacing apart width of the strips. All of the grating strips 22 are connected electrically to a common point forming a single electrode that is connected through lead 26 to the positive side of voltage source 16. The electrode, however, may be divided and separately connected to each of the grating strips to provide spatial control of the modulation electrically. Also, the width of the various strips in the grating and the spacings between each of the strips can be altered over the grating for additional modulation control. The exposed surface of aluminum layer 20 of the grating and the exposed surface of silicon layer 18 is rubbed in a conventional manner to provide alignment to the input polarization.

A layer of spacer material 30 such as mylar of a thickness of approximately 0.5 mils is placed over one surface of grid 20. Spacer 30 has a center section cut out at 32 to provide a cavity for receiving liquid crystal 34 therein. Liquid crystal 34 filling space 32 is in contact with photoconductor structure 18 through the spaces between grid strips 22 and also in contact with strips 22. Even though applicant uses a mylar thickness of approximately 0.5 mils, other thicknesses of a suitable spacer material can be used. An output window in substrate material 36 such as of glass has opposite surfaces and one of the surfaces has an Indium Tin Oxide layer 38 deposited thereon with the exposed surface of the Indium Tin Oxide layer 38 being rubbed in a conventional manner to provide alignment for the liquid crystal at an angle of between 0° and 90° to the input polarization. End window 36 and Indium Tin Oxide layer 6 are placed in contact with liquid crystal 34 and one surface of mylar spacer 30. Indium Tin Oxide layer 38 has an electrial lead 40 connected thereto and to ground and the negative side of variable voltage source 16. Layer 38 as used in this invention is approximately 80 ohm cm with a thickness of about 1,000 angstroms. An analyzer 42 of conventional structure is adjusted at an angle of 0° or 90° to the direction the alignment of the output at end window 36. With an input light source 44 of a uniform and constant source such as a coherent linearly polarized plane wave light source at input 10, an output modulated beam at output 48 can be modulated spatially utilizing an incoherent writing source 6 at input window 10 for impinging on photoconductor 18. The device of this invention can also be used in a reflection mode where the input polarized source is reflected from an output face at output window 36.

In operation, light from light source 44 enters the modulator and passes through glass window 10, tin oxide layer 12, photoconductor layer 18, and through the grating spaces 24 of aluminum grating 20. As the light enters liquid crystal 34 with no voltage applied from voltage source 16, its input light polarization is altered such that it emerges from liquid crystal 34 and output window and tin indium oxide layer 38 assembly. Therefore, the modulator output through analyzer 42 is at a minimum since the analyzer is rotated 90° to the output alignment. As voltage is increased from source 16 to grating 20 the potential in the grating spaces also increases to some fraction of the electrode voltage. Further increases in voltage from source 16 causes the potential in the gratings spaces to increase to a level sufficient to switch on the light traveling through this region of the grating by destroying the twist in liquid crystal 34. Now as writing light 46 is applied to photoconductor layer 18, the impedance of the photoconductor layer is reduced and causes a reduction in potential to the areas of liquid crystal 34 in the grating space region. Therefore, a modulation of the output light results.

It should be noted that the spatial light modulator of this invention uses a three electrode structure which adds an additional dimension over a two electrode structure in the control of the electric field. This three electrode structural feature allows very thin types of photoconductors to be used to provide large modulation effects. In particular, applicant's invention allows for the use of very thin (<1 micron) amorphous silicon layers which have not been previously possible with nematic types of liquid crystals. Applicants device has been found to work exceptionally well and with accuracy.

I claim:

1. An amorphous silicon spatial light modulator comprising input and output end windows of light transparent material and a three electrode structure sandwiched between said windows and including a tin oxide sandwich layer on a surface of said input window, a photoconductor sandwich layer over a surface of said tin oxide layer, an aluminum grating structure mounted over a surface of said photoconductor layer, a liquid crystal layer with one surface of the layer in contact with the grating structure, and an Indium Tin Oxide layer mounted on a surface of said output window and having a surface that contacts an opposite surface of said liquid crystal.

2. An amorphous silicon spatial light modulator as set forth in claim 1, wherein said input and output windows are glass, said photoconductor is made of amorphous silicon, said grating is made of aluminum and includes a plurality of strips that are spaced apart with the strips being connected to an electrical lead, and said liquid crystal being contained in an opening through a mylar support layer.

3. An amorphous silicon spatial light modulator as set forth in claim 2, wherein said tin oxide layer is approximately 1,000 angstroms, wherein said amorphous silicon photoconductor is about 1 micron thick PIN diode structure with dark resistivity of about 5 times $10^9$ ohm cm, and said Indium Tin Oxide layer is a layer approximately 1,000 angstroms.

4. An amorphous silicon spatial light modulator as set forth in claim 3, wherein said grating has a thickness of about 1,500 angstroms, said strips have a width of about 12 microns and the width of the space between the strips is the same as the width of the strips.

* * * * *